United States Patent
Kanzaki (10) Patent No.: US 11,268,433 B2
(45) Date of Patent: Mar. 8, 2022

(54) VALVE DEVICE

(71) Applicant: DENSO CORPORATION, Kariya (JP)

(72) Inventor: Shogo Kanzaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/083,422

(22) Filed: Oct. 29, 2020

(65) Prior Publication Data
US 2021/0140360 A1 May 13, 2021

(30) Foreign Application Priority Data
Nov. 7, 2019 (JP) ............................. JP2019-202522

(51) Int. Cl.
| | | |
|---|---|---|
| *F01P 7/14* | (2006.01) | |
| *F16K 11/00* | (2006.01) | |
| *F16K 27/00* | (2006.01) | |
| *F16K 37/00* | (2006.01) | |
| *F01P 11/04* | (2006.01) | |

(52) U.S. Cl.
CPC ................ *F01P 7/14* (2013.01); *F01P 11/04* (2013.01); *F16K 37/00* (2013.01); *F01P 2007/146* (2013.01)

(58) Field of Classification Search
CPC ..... F01P 2007/146; F01P 7/14; F16K 31/041; F16K 11/0856; F16K 27/00; F16K 31/046
See application file for complete search history.

(56) References Cited

U.S. PATENT DOCUMENTS

| | | | | |
|---|---|---|---|---|
| 6,659,050 B1* | 12/2003 | Creech | .................... | F01P 7/167 123/41.08 |
| 2002/0047050 A1* | 4/2002 | Leu | ..................... | G05D 23/1393 236/12.16 |
| 2006/0102865 A1* | 5/2006 | Pervaiz | ............... | F16K 31/1635 251/286 |
| 2010/0126594 A1* | 5/2010 | Sheppard | .................. | F01P 7/16 137/340 |
| 2010/0282190 A1* | 11/2010 | Stoermer | ............ | F16K 11/0856 123/41.08 |
| 2016/0040585 A1* | 2/2016 | Schaefer | ................... | F01P 3/20 137/1 |

(Continued)

FOREIGN PATENT DOCUMENTS

CN 206246736 6/2017

OTHER PUBLICATIONS

U.S. Appl. No. 17/083,540, to Nomura, entitled "Valve Device", filed Oct. 29, 2020 (84 pages).

(Continued)

*Primary Examiner* — Long T Tran
(74) *Attorney, Agent, or Firm* — Nixon & Vanderhye P.C.

(57) ABSTRACT

A valve device include a drive device cover that is placed outside a housing. The drive device cover receives a drive device of a valve and a rotational angle sensor. The drive device cover has a cover main body and a connector. The connector electrically connects the drive device and the rotational angle sensor to at least one external device. The connector is placed on one side of the cover main body where a pipe member is placed relative to the housing in a perpendicular direction that is perpendicular to an axial direction, and the connector projects from the cover main body on the one side of the cover main body.

7 Claims, 7 Drawing Sheets

(56) References Cited

U.S. PATENT DOCUMENTS

| | | | |
|---|---|---|---|
| 2017/0009894 A1* | 1/2017 | Seko | F16K 5/0663 |
| 2017/0074154 A1* | 3/2017 | Kaneko | F01P 11/18 |
| 2019/0003370 A1 | 1/2019 | Nomura et al. | |
| 2019/0048782 A1* | 2/2019 | Kanesaka | F01P 3/18 |
| 2019/0219179 A1 | 7/2019 | Sato | |
| 2019/0283534 A1* | 9/2019 | Jiang | F16K 31/535 |
| 2020/0109787 A1 | 4/2020 | Tsuji | |
| 2020/0109788 A1 | 4/2020 | Ikemoto | |
| 2020/0114725 A1 | 4/2020 | Kanzaki | |
| 2020/0149462 A1 | 5/2020 | Kanzaki | |

OTHER PUBLICATIONS

U.S. Appl. No. 17/083,524, to Kanzaki, entitled "Valve Device", filed Oct. 29, 2020 (40 pages).
U.S. Appl. No. 17/083,422, filed Oct. 29, 2020, Valve Device.
U.S. Appl. No. 17/083,524, filed Oct. 29, 2020, Valve Device.
U.S. Appl. No. 17/083,540, filed Oct. 29, 2020, Valve Device.

* cited by examiner

VALVE DEVICE

CROSS REFERENCE TO RELATED APPLICATION

This application is based on and incorporates herein by reference Japanese Patent Application No. 2019-202522 filed on Nov. 7, 2019.

TECHNICAL FIELD

The present disclosure relates to a valve device that adjusts a flow rate of coolant for an internal combustion engine.

BACKGROUND

Previously, there has been proposed a valve device that adjusts a flow rate of coolant for an internal combustion engine. This valve device includes: a housing, which has a plurality of flow outlets for discharging the coolant; a valve, which adjusts the flow rate of the coolant discharged from the respective flow outlets; and a pipe member, which has a plurality of pipes respectively communicated with the flow outlets. The valve has a rotatable shaft that rotates the valve element. The flow outlets are respectively arranged at different locations in an axial direction of the rotatable shaft. The pipe member is installed to the housing at a location that is on one side of the housing in a perpendicular direction, which is perpendicular to the rotatable shaft. Specifically, the pipe member is installed to the housing at the location that is on the one side of the housing, which is opposite to the engine in the perpendicular direction.

SUMMARY

This section provides a general summary of the disclosure, and is not a comprehensive disclosure of its full scope or all of its features.

According to the present disclosure, there is provided a valve device configured to adjust a flow rate of coolant for an internal combustion engine. The valve device includes a housing, a valve, a pipe member, a drive device, a sensor and a drive device cover. The housing has an inside space, which is formed at an inside of the housing. The valve is placed in the inside space. The pipe member is installed to the housing at a location, which is on one side of the housing in a perpendicular direction that is perpendicular to an axial direction of a rotatable shaft of the valve. The pipe member has a plurality of pipes, each of which forms a flow passage that is communicated with a corresponding one of a plurality of flow outlets of the housing. The drive device is configured to rotate the rotatable shaft and is placed outside the housing at a location, which is on one side of the housing in the axial direction. The sensor is configured to detect a rotational angle of the rotatable shaft and is placed outside the housing at the location that is on the one side of the housing in the axial direction. The drive device cover receives the drive device and the sensor at an inside of the drive device cover and is placed outside the housing at the location that is on the one side of the housing in the axial direction. The drive device cover includes a cover main body and a connector. The cover main body forms a space, which receives the drive device. The connector is configured to electrically connect the drive device and the sensor to at least one external device. The connector is placed on one side of the cover main body where the pipe member is placed relative to the housing in the perpendicular direction.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

Previously, there has been proposed a valve device that adjusts a flow rate of coolant for an internal combustion engine. This valve device includes: a housing, which has a plurality of flow outlets for discharging the coolant; a valve, which adjusts the flow rate of the coolant discharged from the respective flow outlets; and a pipe member, which has a plurality of pipes respectively communicated with the flow outlets. The valve has a rotatable shaft that rotates the valve element. The flow outlets are respectively arranged at different locations in an axial direction of the rotatable shaft. The pipe member is installed to the housing at a location that is on one side of the housing in a perpendicular direction, which is perpendicular to the rotatable shaft. Specifically, the pipe member is installed to the housing at the location that is on the one side of the housing, which is opposite to the engine in the perpendicular direction.

Furthermore, the above-described valve device further includes: a drive device, which drives the rotatable shaft of the valve; a sensor, which detects a rotational angle of the rotatable shaft of the valve; and a cover, which receives the drive device and the sensor. The cover has: a cover main body, which forms a space that receives the drive device; and a connector, which electrically connects the drive device and the sensor to the outside. The connector is placed on the other side of the cover main body, which is opposite to the one side where the pipe member is placed relative to the housing in the perpendicular direction, and the connector projects from the cover main body on the other side of the cover main body in the perpendicular direction. Specifically, the connector is placed on the other side of the cover main body where the engine is placed, and the connector projects from the cover main body on the other side of the cover main body toward the engine.

In the above-described valve device, the connector is placed on the other side of the cover main body, which is opposite to the one side where the pipe member is placed relative to the housing in the perpendicular direction, and the connector projects from the cover main body on the other side of the cover main body in the perpendicular direction. Thus, a size of the valve device measured in the projecting direction of the connector is relatively large.

According to the present disclosure, there is provided a valve device configured to adjust a flow rate of coolant for an internal combustion engine. The valve device includes a housing, a valve, a pipe member, a drive device, a sensor and a drive device cover.

The housing has: an inside space, which is formed at an inside of the housing; a flow inlet, which is configured to conduct the coolant into the inside space; and a plurality of flow outlets, which are configured to discharge the coolant from the inside space. The valve is placed in the inside space and has: a valve element that is configured to adjust a flow rate of the coolant outputted from each of the plurality of flow outlets; and a rotatable shaft that is configured to rotate the valve element. The pipe member is installed to the housing at a location, which is on one side of the housing in a perpendicular direction that is perpendicular to an axial direction of the rotatable shaft. The pipe member has a plurality of pipes, each of which forms a flow passage that is communicated with a corresponding one of the plurality of flow outlets. The drive device is configured to rotate the rotatable shaft and is placed outside the housing at a location, which is on one side of the housing in the axial direction. The sensor is configured to detect a rotational angle of the rotatable shaft and is placed outside the housing at the location that is on the one side of the housing in the axial direction. The drive device cover receives the drive device and the sensor at an inside of the drive device cover and is placed outside the housing at the location that is on the one side of the housing in the axial direction. The drive device cover has: a cover main body that forms a space, which receives the drive device; and a connector that is configured to electrically connect the drive device and the sensor to at least one external device. The connector is placed on one side of the cover main body where the pipe member is placed relative to the housing in the perpendicular direction, and the connector projects from the cover main body on the one side of the cover main body in the perpendicular direction.

With the above-described valve device, the maximum size of the valve device measured in the projecting direction of the connector can be reduced in comparison to the case where the connector is placed on the other side of the cover main body, which is opposite to the one side of the cover main body where the pipe member is placed relative to the housing in the perpendicular direction, and the connector projects from the cover main body on the other side in the perpendicular direction.

Now, embodiments of the present disclosure will be described.

First Embodiment

A first embodiment will be described with reference to FIGS. 1 to 7. The valve device 10 is applied to, for example, a cooling system 1 that circulates coolant, which cools an internal combustion engine (hereinafter referred to as an engine) 2 of a vehicle, and the valve device 10 controls a flow rate of the coolant that is circulated in the cooling system 1. The coolant in this specification is, for example, cooling liquid that contains ethylene glycol as a main component. Any other suitable type of liquid may be used as the coolant of the present disclosure.

Figure 1:
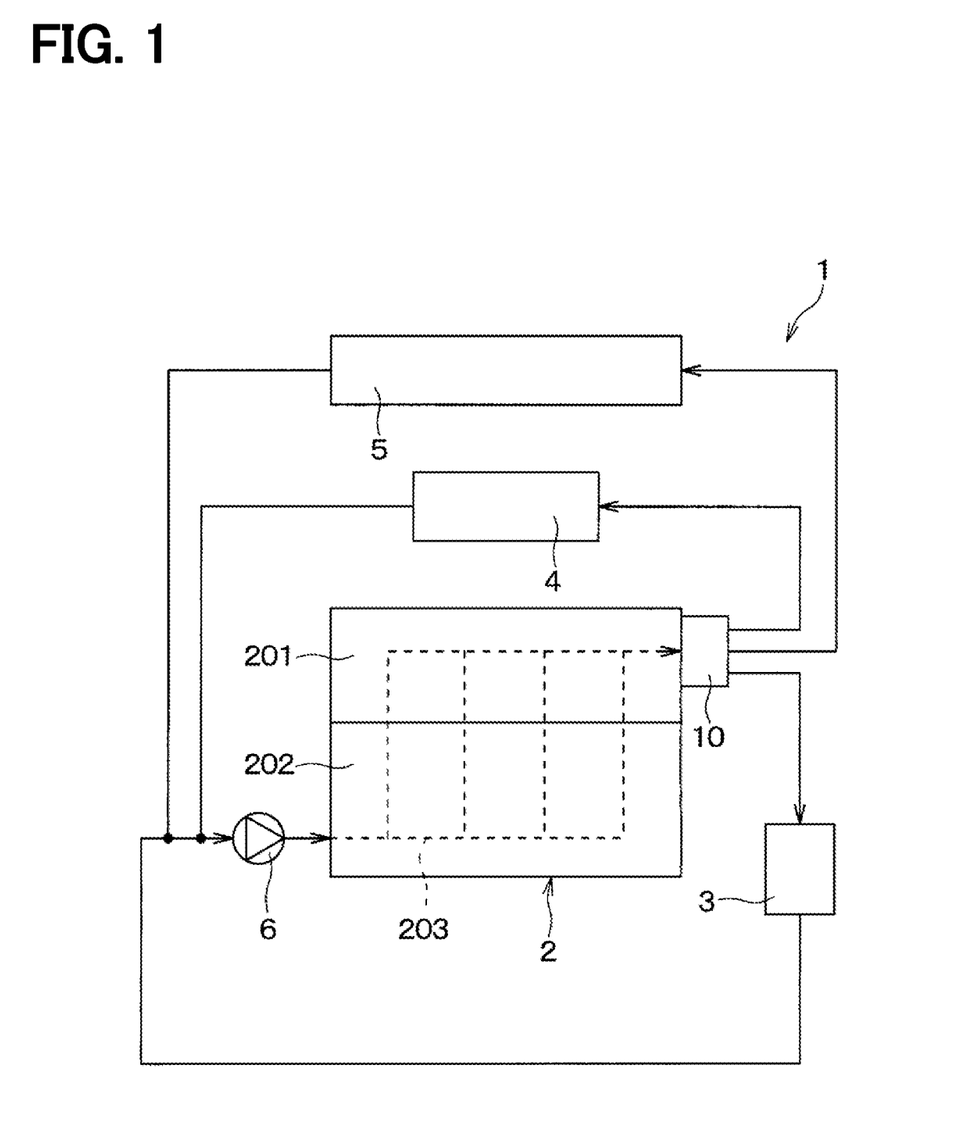
FIG. 1 is a schematic configuration diagram of a cooling system, to which a valve device according to a first embodiment is applied.

As shown in FIG. 1, the cooling system 1 includes a valve device 10, the engine 2, an air conditioning heat exchanger 3, an oil cooler 4, a radiator 5 and a water pump 6.

The engine 2 includes: a cylinder head 201, which receives, for example, spark plugs; a cylinder block 202, which receives, for example, cylinders; and a water jacket 203, which forms a passage of the coolant. The coolant, which flows in the water jacket 203, is heated through heat exchange between the coolant and heat generated by operation of, for example, the cylinders. The valve device 10 is connected to an outlet of the water jacket 203.

The valve device 10 is installed to the cylinder head 201, at which the outlet of the water jacket 203 is placed. The coolant, which is heated at the time of flowing through the water jacket 203, flows into the valve device 10. The valve device 10 is configured to supply a required flow rate of the coolant to each of the corresponding devices, such as the air conditioning heat exchanger 3, the oil cooler 4 and the radiator 5.

The air conditioning heat exchanger 3 exchanges heat between the coolant discharged from the valve device 10 and the air to be blown into a vehicle cabin to release the heat from the coolant. The water pump 6 is placed on the downstream side of the air conditioning heat exchanger 3 such that an inlet of the water pump 6 is connected to an outlet of the air conditioning heat exchanger 3. The coolant, which has passed through the air conditioning heat exchanger 3, flows into the water pump 6.

The oil cooler 4 exchanges heat between the coolant discharged from the valve device 10 and oil to cool the oil. The water pump 6 is placed on the downstream side of the oil cooler 4 such that the inlet of the water pump 6 is connected to an outlet of the oil cooler 4. The coolant, which has passed through the oil cooler 4, flows into the water pump 6.

The radiator 5 exchanges heat between the coolant discharged from the valve device 10 and the external air to release the heat from the coolant. The water pump 6 is placed on the downstream side of the radiator 5 such that the inlet of the water pump 6 is connected to an outlet of the radiator 5. The coolant, which has passed through the radiator 5, flows into the water pump 6.

The air conditioning heat exchanger 3, the oil cooler 4 and the radiator 5 are placed on the upstream side of the water pump 6 such that the outlet of the air conditioning heat exchanger 3, the outlet of the oil cooler 4 and the outlet of the radiator 5 are connected to the inlet of the water pump 6. The water jacket 203 is placed on the downstream side of the water pump 6 such that an inlet of the water jacket 203 is connected to an outlet of the water pump 6. The water pump 6 pumps the coolant, which is received from the air conditioning heat exchanger 3, the oil cooler 4 and the radiator 5, to the water jacket 203.

As discussed above, in the cooling system 1, the water pump 6 pumps the coolant to circulate the coolant through the cooling system 1, and the valve device 10 is configured to supply the required flow rate of the coolant to each of the corresponding devices.

Figure 2:
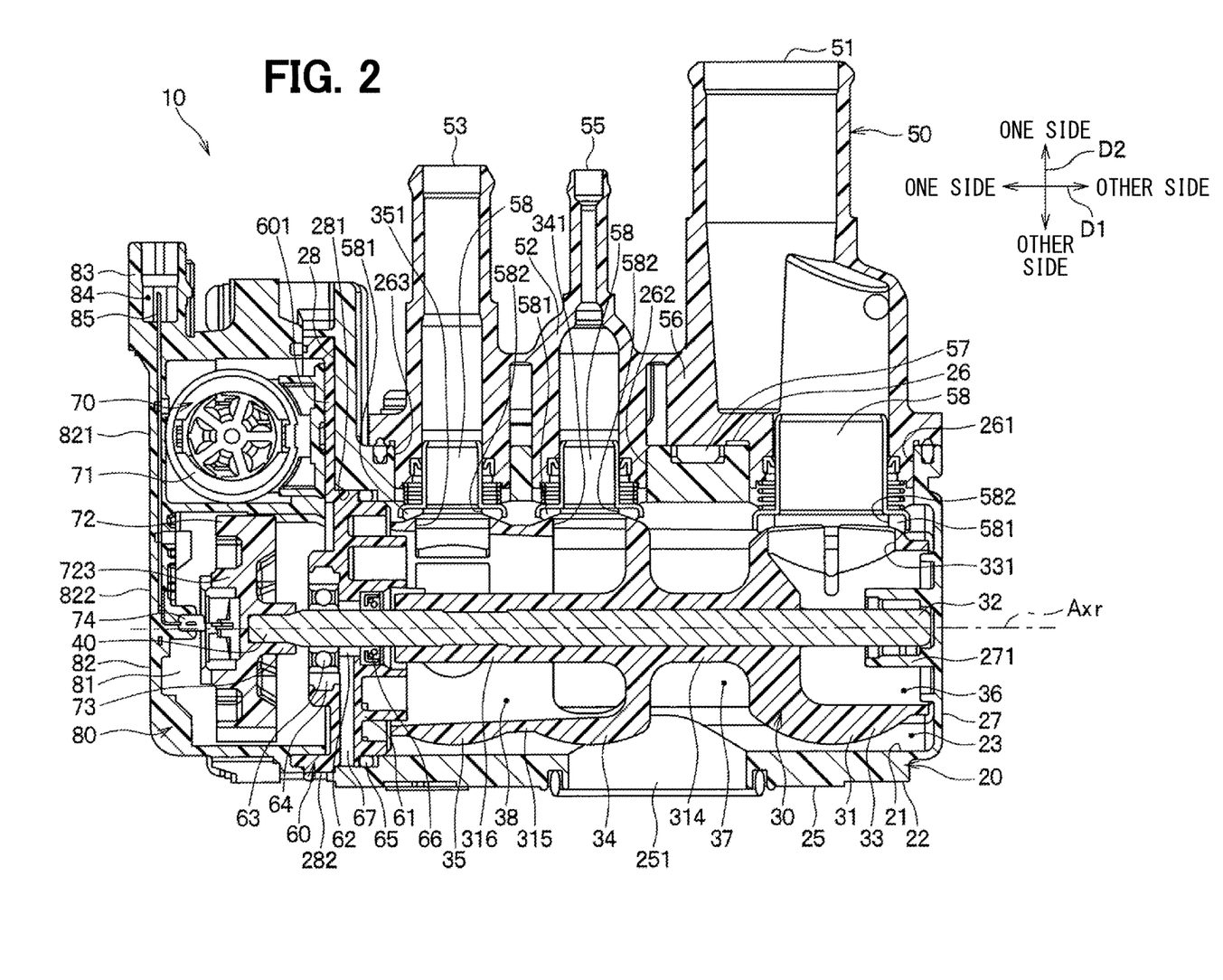
FIG. 2 is a schematic cross-sectional view of the valve device according to the first embodiment.

Next, the valve device 10 will be described. As shown in FIG. 2, the valve device 10 includes a housing 20, a valve 30, a pipe member 50, a partition wall 60, a drive device 70 and a drive device cover 80. An axial direction D1 shown in FIG. 2 is an axial direction of a shaft 32 described later. Furthermore, the left side of FIG. 2 is defined as one side (also referred to as one axial side) in the axial direction D1, and the right side of FIG. 2 is defined as the other side (also referred to as the other axial side) in the axial direction D1.

Figure 3:
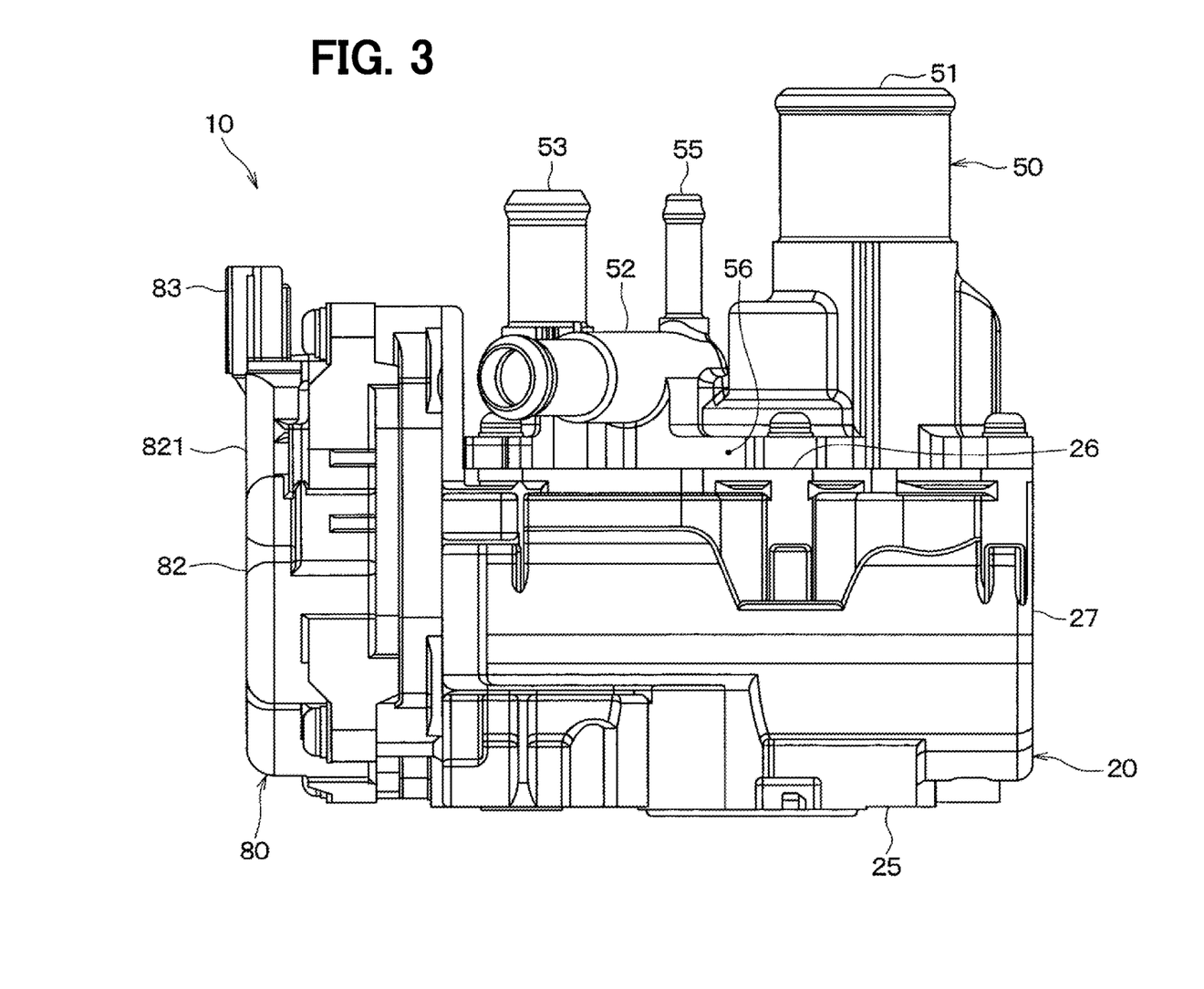
FIG. 3 is a schematic side view of the valve device according to the first embodiment.
Figure 4:
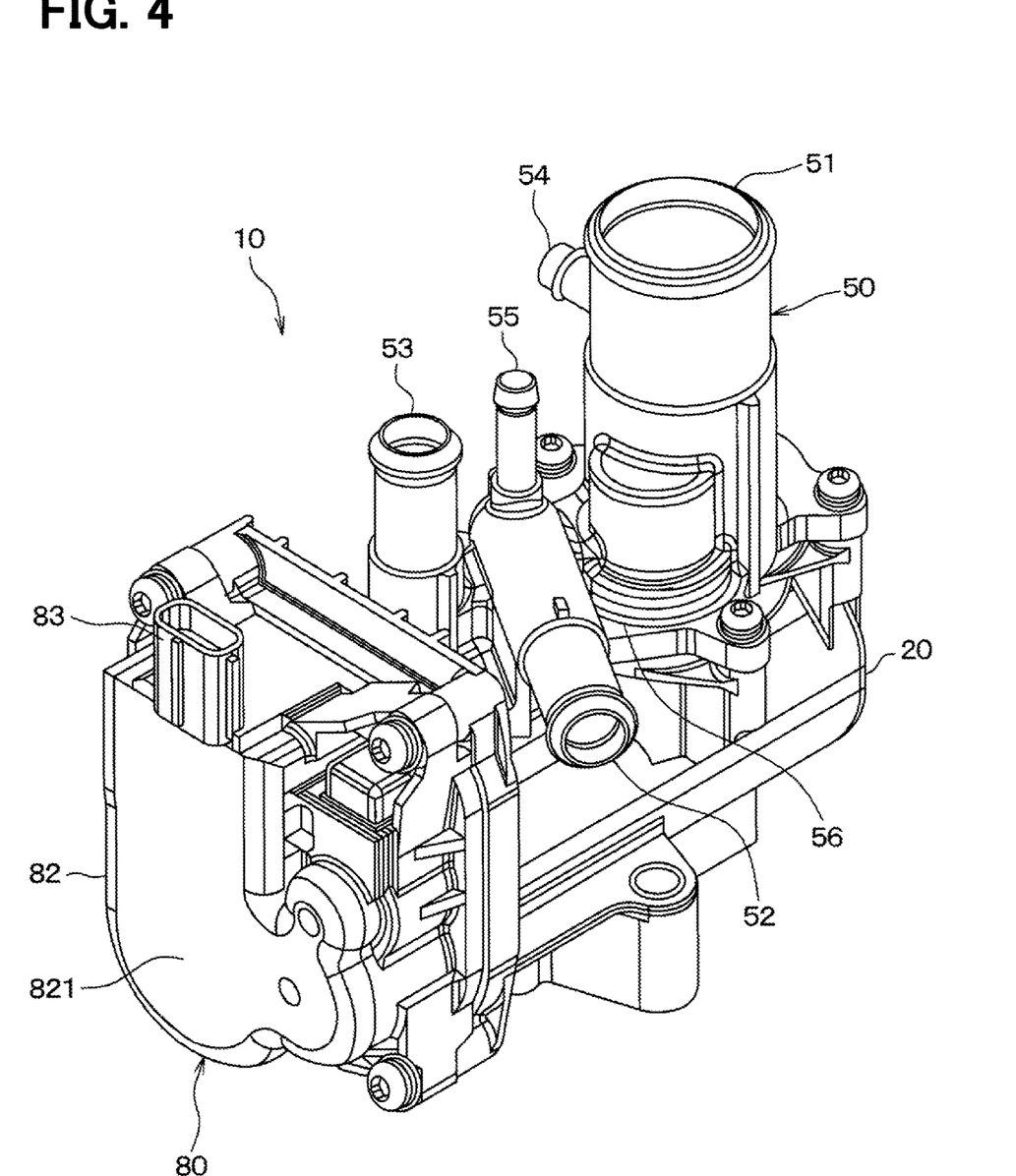
FIG. 4 is a schematic perspective view of the valve device according to the first embodiment.

The axial direction of the shaft 32 is a direction that is parallel to a central axis Axr of the shaft 32. A perpendicular direction D2 shown in FIG. 2 is a direction that is perpendicular to the axial direction of the shaft 32. Furthermore, the upper side of FIG. 2 is defined as one side (also referred to as one radial side) in the perpendicular direction D2, and the lower side of FIG. 2 is defined as the other side (also referred to as the other radial side) in the perpendicular direction D2. Furthermore, the housing 20, the pipe member 50 and the drive device cover 80 shown in FIG. 2 are also depicted in FIGS. 3 and 4.

The housing 20 is a receiving portion that receives the valve 30, and the housing 20 is shaped in a bottomed tubular form and is made of a resin member. The housing 20 has an inside space 23 that is formed at an inside of the housing 20. The housing 20 has: a housing inner wall 21, which forms the inside space 23; and a housing outer wall 22, which forms an outer shell of the housing 20.

The housing inner wall 21 is shaped in a cylindrical tubular form such that the inside space 23 is shaped in a cylindrical form. The valve 30 is placed in the inside space 23.

The housing outer wall 22 has: an engine installation surface 25, to which the engine 2 is installed; a pipe installation surface 26, to which the pipe member 50 is installed; a housing bottom surface 27, which forms a bottom surface of the housing outer wall 22; and a housing opening surface 28, to which the partition wall 60 is installed. The engine installation surface 25 and the pipe installation surface 26 are respectively placed at corresponding locations, at which the engine installation surface 25 and the pipe installation surface 26 are opposed to each other. In other words, the pipe installation surface 26 is located at an opposite side of the housing 20, which is opposite to the engine installation surface 25. The engine installation surface 25 and the pipe installation surface 26 are substantially parallel to each other. Furthermore, the housing bottom surface 27 and the housing opening surface 28 are respectively placed at corresponding locations, at which the housing bottom surface 27 and the housing opening surface 28 are opposed to each other. The housing bottom surface 27 and the housing opening surface 28 are substantially parallel to each other.

The engine installation surface 25 is shaped in a substantially planar form and is configured to enable installation of the engine 2 to the engine installation surface 25. Furthermore, an inlet port 251, through which the coolant flows into the inside space 23, is formed at the engine installation surface 25. The inlet port 251 opens in a circular form, and the outlet of the water jacket 203 is connected to the inlet port 251. The inlet port 251 serves as a flow inlet, which is configured to conduct the coolant into the inside space 23 of the housing 20.

The pipe installation surface 26 is shaped in a substantially planar form and is configured to enable installation of the pipe member 50 described later to the pipe installation surface 26. A first outlet port 261, a second outlet port 262 and a third outlet port 263 are formed at the pipe installation surface 26. The first outlet port 261, the second outlet port 262 and the third outlet port 263 are configured to discharge the coolant, which is supplied to the inside space 23 through the inlet port 251, to the pipe member 50. Each of the first outlet port 261, the second outlet port 262 and the third outlet port 263 opens in a circular form. The first outlet port 261, the second outlet port 262 and the third outlet port 263 are located at different locations along the pipe installation surface 26 in the axial direction D1. The first outlet port 261, the second outlet port 262 and the third outlet port 263 serve as a plurality of flow outlets, which are configured to discharge the coolant from the inside space 23 of the housing 20.

The housing bottom surface 27 is shaped in a substantially planar form and is connected to the engine installation surface 25 and the pipe installation surface 26. Furthermore, a shaft support portion 271, which is configured to rotatably support the shaft 32 described later, is formed at a portion of the housing inner wall 21, which is located on an inner side of the housing bottom surface 27.

The housing opening surface 28 is shaped in a substantially planar form and is configured to enable installation of the partition wall 60 described later to the housing opening surface 28. A housing opening 281, which communicates between the inside space 23 and an outside of the housing 20, is formed at the housing opening surface 28. When the partition wall 60 is installed to the housing opening surface 28, the housing opening 281 is closed with the partition wall 60.

The pipe member 50 is installed to the housing 20 at the location that is on the one side (the one radial side) of the housing 20 in the perpendicular direction D2. In the present embodiment, the other side (the other radial side) of the housing 20 in the perpendicular direction D2 is a side where the engine 2 is placed in the perpendicular direction D2. Therefore, the pipe member 50 is installed to the side of the housing 20, which is opposite to the engine 2. The pipe member 50 is configured to output the coolant, which is supplied to the inside space 23, to the corresponding devices, such as the air conditioning heat exchanger 3, the oil cooler 4 and the radiator 5. The pipe member 50 is made of, for example, a resin member.

The pipe member 50 has a plurality of pipes, each of which forms a flow passage that is communicated with a corresponding one of the first outlet port 261, the second outlet port 262 and the third outlet port 263. Specifically, as shown in FIGS. 2, 3, and 4, the pipe member 50 has: a first pipe portion 51, a second pipe portion 52, a third pipe portion 53, a fourth pipe portion 54 and a fifth pipe portion 55, which respectively serve as the plurality of pipes; and a pipe connecting portion 56. Each pipe portion 51, 52, 53, 54, 55 is shaped in a cylindrical tubular form.

The pipe connecting portion 56 is configured to join the first pipe portion 51, the second pipe portion 52 and the third pipe portion 53 together and to install the pipe member 50 to the pipe installation surface 26. The pipe connecting portion 56 contacts and is fixed to the pipe installation surface 26. Furthermore, as shown in FIG. 2, a gasket 57, which limits leakage of the coolant to the outside of the valve device 10, is installed between the pipe connecting portion 56 and the pipe installation surface 26.

An upstream part of the first pipe portion 51, which is located on the upstream side in the flow direction of the coolant, is placed at an inside of the first outlet port 261. A downstream part of the first pipe portion 51, which is located on the downstream side in the flow direction of the coolant, is connected to the radiator 5 through a hose (not shown). An upstream part of the second pipe portion 52, which is located on the upstream side in the flow direction of the coolant, is placed at an inside of the second outlet port 262. A downstream part of the second pipe portion 52, which is located on the downstream side in the flow direction of the coolant, is connected to the air conditioning heat exchanger 3 through a hose (not shown). An upstream part of the third pipe portion 53, which is located on the upstream side in the flow direction of the coolant, is placed at an inside of the third outlet port 263. A downstream part of the third pipe portion 53, which is located on the downstream side in the flow direction of the coolant, is connected to the oil cooler 4 through a hose (not shown).

As shown in FIG. 4, an upstream part of the fourth pipe portion 54, which is located on the upstream side in the flow direction of the coolant, is connected to the upstream part of the first pipe portion 51. A downstream part of the fourth pipe portion 54, which is located on the downstream side in the flow direction of the coolant, is connected to a reservoir tank (not shown) through a hose (not shown). An upstream part of the fifth pipe portion 55, which is located on the upstream side in the flow direction of the coolant, is connected to the upstream part of the second pipe portion 52, as shown in FIG. 4. A downstream part of the fifth pipe portion 55, which is located on the downstream side in the flow direction of the coolant, is connected to a throttle (not shown) through a hose (not shown).

Furthermore, a seal unit 58 is placed between each of the first to third pipe portions 51-53 and a corresponding one of the first to third outlet ports 261-263. Each seal unit 58 limits leakage of the coolant from a gap between the corresponding one of the first to third pipe portions 51-53 and the corresponding one of the first to third outlet ports 261-263. A valve seal 581, which limits leakage of the coolant toward the upstream side in the flow direction of the coolant, is placed at each seal unit 58.

The valve seal 581 is shaped substantially in a circular ring form and is made of, for example, a resin member. The valve seal 581 has a seal opening 582, through which the coolant can flow. An upstream surface of valve seal 581, which is a surface located on the upstream side in the flow direction of the coolant, contacts an outer peripheral wall of a valve element 31 described later.

The partition wall 60 is a wall that partitions between the inside space 23 and the outside of the housing 20. The partition wall 60 is a separate member that is formed separately from the housing 20. The partition wall 60 contacts and is fixed to the housing opening surface 28. The partition wall 60 is shaped in a plate form and is made of, for example, a resin member. The partition wall 60 is placed such that the partition wall 60 covers the housing opening 281.

The partition wall 60 serves as a member, which holds the shaft 32, and a member, which receives the drive device 70. Specifically, the partition wall 60 closes the housing opening 281 and holds the valve 30 described later. Furthermore, the partition wall 60 forms a receiving space that is formed between the partition wall 60 and the drive device cover 80 and receives the drive device 70.

Specifically, the partition wall 60 has a contact portion 601 and an opening closing portion 61. The contact portion 601 is a portion of the partition wall 60 that is shaped in a plate form and contacts the housing opening surface 28. The opening closing portion 61 is a portion of the partition wall 60, which closes the housing opening 281.

A shaft insertion through hole 62, through which the shaft 32 of the valve 30 is inserted, is formed at the opening closing portion 61 to enable insertion of the shaft 32 through the opening closing portion 61. Furthermore, a bearing 63, which rotatably supports the shaft 32 inserted through the shaft insertion through hole 62, is installed to the partition wall 60.

The opening closing portion 61 is placed at an inside of the housing opening 281. The opening closing portion 61 is shaped substantially in a circular plate form and is configured such that a plate thickness direction of the opening closing portion 61, which is perpendicular to a plane of the opening closing portion 61, coincides with an axial direction of a central axis of the housing inner wall 21. The opening closing portion 61 is placed such that an outer wall of the opening closing portion 61 contacts an inner wall of the housing opening 281. The inner wall of the housing opening 281 is a portion of the housing inner wall 21 that forms the housing opening 281.

A housing seal member 65, which is shaped substantially in a circular ring form, is placed between the outer wall of the opening closing portion 61 and the inner wall of the housing opening 281. The housing seal member 65 closes a gap formed between the outer wall of the opening closing portion 61 and the inner wall of the housing opening 281.

In a natural state of the housing seal member 65 where the housing seal member 65 is not compressed, an outer diameter of the housing seal member 65 is smaller than an inner diameter of the housing opening 281 and is larger than an outer diameter of the opening closing portion 61. When the housing seal member 65 is placed between the housing opening 281 and the opening closing portion 61, the housing seal member 65 is inwardly compressed in a radial direction of the housing opening 281.

Furthermore, a shaft seal member 66 is installed to an inner peripheral portion of the shaft insertion through hole 62 at the opening closing portion 61. The shaft seal member 66 is shaped substantially in a circular ring form and is made of a resin member. The shaft seal member 66 limits a flow of the coolant, which has entered the inside space 23, into the shaft insertion through hole 62. An inner diameter of the shaft seal member 66 is smaller than an outer diameter of the shaft 32. In a state where the shaft seal member 66 is installed to the inner peripheral portion of the shaft insertion through hole 62, the shaft 32 is inserted through the shaft seal member 66.

Furthermore, a partition wall through hole 67 is formed in the opening closing portion 61 to discharge the coolant, which has entered the shaft insertion through hole 62, to the outside. The partition wall through hole 67 extends from the shaft insertion through hole 62 toward the radially outer side of the shaft insertion through hole 62 and penetrates through the opening closing portion 61. The partition wall through hole 67 is communicated with a housing through hole 282 that extends through the housing 20.

The shaft insertion through hole 62 is formed such that an axial direction of a central axis of the shaft insertion through hole 62 coincides with the axial direction of the central axis of the housing inner wall 21, and in a state where the shaft 32 is inserted through the shaft insertion through hole 62, the central axis of the shaft insertion through hole 62 and a central axis of the bearing 63 are coaxial with the central axis Axr of the shaft 32.

The bearing 63 is, for example, a ball bearing and is configured to rotatably support the shaft 32 inserted through the shaft insertion through hole 62. Furthermore, a metal ring 64, which is used to install the bearing 63, is placed at an outer peripheral portion of the bearing 63. The metal ring 64 is shaped in a circular ring form and is made of, for example, a metal member, and the metal ring 64 is configured such that the bearing 63 can be press fitted to an inside of the metal ring 64.

Next, the valve 30 will be described. The valve 30 is a ball valve and includes the valve element 31, which is made of resin, and the shaft 32, which is made of metal. The valve element 31 is configured to control the flow rate of the coolant discharged through the valve 30. Specifically, the valve element 31 regulates the flow rate of the coolant discharged from the first outlet port 261, the flow rate of the coolant discharged from the second outlet port 262 and the flow rate of the coolant discharged from the third outlet port 263. For example, the valve element 31 is coupled to the shaft 32 and is configured to be rotated integrally with the shaft 32 about the central axis Axr of the shaft 32.

The shaft 32 serves as a rotatable shaft that is configured to rotate the valve element 31. A cross section of the shaft 32 is shaped substantially in a circular from. An end part of the shaft 32, which is on the one side (the one axial side) in the axial direction D1, is connected to a gear arrangement 72 described later. The other end part of the shaft 32, which is located on the other side (the other axial side) in the axial direction D1, is connected to the shaft support portion 271.

The valve element 31 extends along the central axis Axr of the shaft 32. The valve element 31 has a first ball valve 33, a second ball valve 34, a third ball valve 35, a tubular connecting portion 314, a tubular valve connecting portion 315 and a shaft connecting portion 316. The first ball valve 33 and the second ball valve 34 are connected with each other through the tubular connecting portion 314, which is shaped in a tubular form. The second ball valve 34 and the third ball valve 35 are connected with each other through the tubular valve connecting portion 315, which is shaped in a tubular form.

The shaft connecting portion 316 is placed at a center of the first to third ball valves 33-35. The valve element 31 is connected to the shaft 32 through the shaft connecting portion 316. For example, the valve element 31 is formed such that the first ball valve 33, the second ball valve 34, the third ball valve 35, the tubular connecting portion 314, the tubular valve connecting portion 315 and the shaft connecting portion 316 are molded together in one-piece through injection molding.

The first to third ball valves 33-35 are respectively shaped in a tubular form and are arranged one after another along the shaft 32 such that a central axis of the first to third ball valves 33-35 is coaxial with the central axis Axr of the shaft 32. Each of the first to third ball valves 33-35 is formed such that an axial center part of the ball valve 33-35, which is centered in the axial direction D1 of the shaft 32, is radially outwardly bulged relative to two opposite end parts of the ball valve 33-35, which are opposite to each other in the axial direction D1 of the shaft 32. Furthermore, each of the first to third ball valves 33-35 forms a flow passage 36, which is configured to conduct the coolant and opens at the two opposite end parts of the ball valve 33-35, which are opposite to each other in the axial direction D1 of the shaft 32.

A first inter-valve space 37, which is defined between the outer peripheral portion of the tubular connecting portion 314 and the housing inner wall 21, is formed between the first ball valve 33 and the second ball valve 34. Specifically, the flow passage 36, which is formed at the inside of the first ball valve 33, is communicated with the flow passage 36, which is formed at the inside of the second ball valve 34, through the first inter-valve space 37.

An outer peripheral portion of the second ball valve 34 and an outer peripheral portion of the third ball valve 35 are connected with each other through an outer peripheral portion of the tubular valve connecting portion 315, and an inner peripheral portion of the second ball valve 34 and an inner peripheral portion of the third ball valve 35 are connected with each other through an inner peripheral portion of the tubular valve connecting portion 315. Specifically, the flow passage 36, which is formed at the inside of the second ball valve 34, is communicated with the flow passage 36, which is formed at the inside of the third ball valve 35, through a second inter-valve space 38 formed at an inside of a tubular valve connecting portion 315.

An opening is formed at the outer peripheral portion of each of the first to third ball valves 33-35 to communicate the flow passage 36 of the ball valve 33-35 to the outside of the ball valve 33-35. Specifically, a first valve element opening 331 is formed at the outer peripheral portion of the first ball valve 33. A second valve element opening 341 is formed at the outer peripheral portion of the second ball valve 34. A third valve element opening 351 is formed at the outer peripheral portion of the third ball valve 35.

The first ball valve 33 is placed at a corresponding location where the first valve element opening 331 can be communicated with the first outlet port 261 and the seal opening 582 of the valve seal 581 placed at the first outlet port 261. The second ball valve 34 is placed at a corresponding location where the second valve element opening 341 can be communicated with the second outlet port 262 and the seal opening 582 of the valve seal 581 placed at the second outlet port 262. The third ball valve 35 is placed at a corresponding location where the third valve element opening 351 can be communicated with the third outlet port 263 and the seal opening 582 of the valve seal 581 placed at the third outlet port 263. Furthermore, the tubular connecting portion 314 is placed at a corresponding location where the tubular connecting portion 314 is opposed to the inlet port 251.

Specifically, the valve 30 is configured such that the coolant, which is discharged from the engine 2, flows into the inside space 23 through the inlet port 251 and then flows into the flow passage 36 of each of the first to third ball valves 33-35 through the first inter-valve space 37. Furthermore, the valve 30 is configured such that when the valve element 31 is rotated to a corresponding rotational position, the coolant can be discharged through the seal opening 582 of the valve seal 581 placed at the corresponding one of the first to third outlet ports 261-263, which respectively correspond to the first to third valve element openings 331-351.

Furthermore, the valve 30 is configured to control the flow rate of the coolant, which is discharged from the valve element 31, according to a size of an overlapping area, in which the corresponding one of the first to third valve element openings 331-351 is overlapped with the corresponding seal opening 582. Specifically, the flow rate of the coolant, which is discharged from the first valve element opening 331, the flow rate of the coolant, which is discharged from the second valve element opening 341, and the flow rate of the coolant, which is discharged from the third valve element opening 351, are controlled by a rotational angle of the valve element 31.

Next, the drive device 70 and the drive device cover 80 will be described. The drive device cover 80 is configured to receive the drive device 70. As shown in FIG. 2, the drive device 70 and the drive device cover 80 are placed at an opposite surface of the partition wall 60, which opposite to the surface of the partition wall 60, to which the housing opening surface 28 contacts. Specifically, the drive device 70 and the drive device cover 80 are placed outside the housing 20 at a location that is on the one side of the housing 20 in the axial direction D1. The drive device cover 80 is shaped in a cup form. A drive device space 81, which receives the drive device 70, is formed at the inside of the drive device cover 80.

The drive device 70 is placed in the drive device space 81. The drive device 70 is configured to drive the valve element 31. Specifically, the drive device 70 is configured to drive the shaft 32. The drive device 70 includes: an electric motor 71 that is configured to output a drive force, which rotates the valve element 31 through the shaft 32; and the gear arrangement 72 that is configured to transmit the drive force, which is outputted from the electric motor 71, to the shaft 32.

Figure 5:
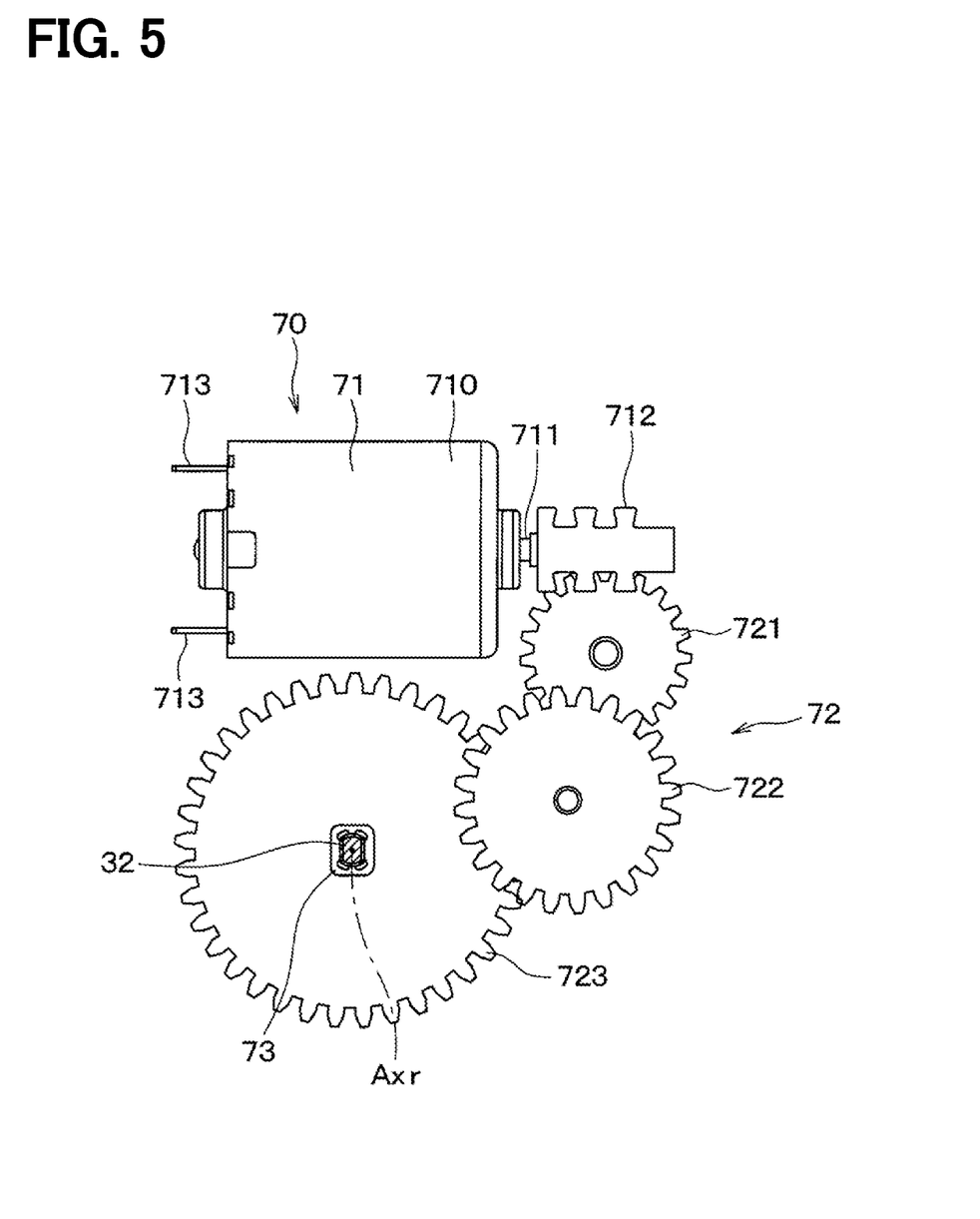
FIG. 5 is a schematic configuration diagram of a drive device according to the first embodiment.

As shown in FIG. 5, the electric motor 71 includes a motor main body 710, a motor shaft 711, a worm gear 712 and motor side terminals 713. The electric motor 71 is configured to output the drive force from the motor main body 710 when the electric power is supplied from a vehicle battery (not shown) to the motor side terminals 713 through a connector 83 described later. The motor main body 710 is shaped substantially in a cylindrical tubular form. The motor shaft 711 projects from an end part of the motor main body 710. The drive force, which is outputted from the motor main body 710, is outputted to the gear arrangement 72 through the motor shaft 711 and the worm gear 712.

The gear arrangement 72 is formed by a speed reducing mechanism that includes a plurality of resin gears. The gear arrangement 72 is configured to transmit the drive force, which is outputted from the motor main body 710, to the shaft 32. Specifically, as shown in FIG. 5, the gear arrangement 72 includes: a first gear 721; a second gear 722 meshed with the first gear 721; and a third gear 723 meshed with the second gear 722. An undepicted portion of the first gear 721 and an undepicted portion of the second gear 722, which are not shown in FIG. 5, are meshed with each other. An undepicted portion of the second gear 722 and an undepicted portion of the third gear 723, which are not shown in FIG. 5, are meshed with each other. The shaft 32 is coupled to the third gear 723. An outer diameter of the second gear 722 is larger than an outer diameter of the first gear 721. An outer diameter of the third gear 723 is larger than the outer diameter of the second gear 722.

The first to third gears 721-723 are arranged such that central axes of the first to third gears 721-723 are perpendicular to a central axis of the worm gear 712. The third gear 723 is arranged such that the central axis of the third gear 723 is coaxial with the central axis Axr of the shaft 32. Furthermore, the third gear 723 has a shaft inserting portion 73, in which the shaft 32 is inserted. As shown in FIG. 2, a shaft end part 40, which is an end part of the shaft 32, is press fitted into the shaft inserting portion 73 such that a rotational angle of the shaft 32 is determined based on a rotational angle of the third gear 723.

The drive device 70 and the shaft 32 are configured such that the worm gear 712, the first to third gears 721-723 and the shaft 32 are synchronously rotated. The rotations of the worm gear 712, the first to third gears 721-723 and the shaft 32 are correlated with each other. Specifically, the rotational angles of the worm gear 712, the first to third gears 721-723 and the shaft 32 are correlated with each other. The worm gear 712, the first to third gears 721-723 and the shaft 32 are configured such that the rotational angle of the correlated one of the worm gear 712, the first to third gears 721-723 and the shaft 32 can be computed based on the rotational angle of the other correlated one of the worm gear 712, the first to third gears 721-723 and the shaft 32.

Furthermore, the valve device 10 includes a rotational angle sensor 74. The rotational angle sensor 74 is a sensor that detects a rotational angle of the gear arrangement 72, i.e., a rotational angle of the shaft 32. The rotational angle sensor 74 is received at an inside of the drive device cover 80. Specifically, like the drive device 70, the rotational angle sensor 74 is placed outside the housing 20 at the location that is on the one side of the housing 20 in the axial direction D1.

Specifically, as shown in FIG. 2, the rotational angle sensor 74 is installed at the drive device space 81 of the drive device cover 80. The rotational angle sensor 74 is placed at a corresponding location where the rotational angle sensor 74 is opposed to the third gear 723. The rotational angle sensor 74 is a Hall sensor (also referred to as a Hall effect sensor) that includes a Hall element, and the rotational angle sensor 74 is configured to detect the rotation angle of the third gear 723 without contact. The rotational angle sensor 74 is connected to an electronic control unit (ECU) and is configured to transmit the detected rotational angle of the third gear 723 to the ECU. The ECU is configured to compute the rotational angle of the shaft 32 based on the rotational angle of the third gear 723 transmitted from the rotational angle sensor 74.

In order to detect the rotational angle of the third gear 723, a contactless type angle sensor, such as an MR sensor or an inductive sensor, or a contact type angle sensor, such as a potentiometer sensor, may be used besides the Hall sensor. Furthermore, the rotational angle sensor 74 may be configured to detect a rotational angle of one of the worm gear 712, the first gear 721 and the second gear 722 in place of the third gear 723.

Figure 6:
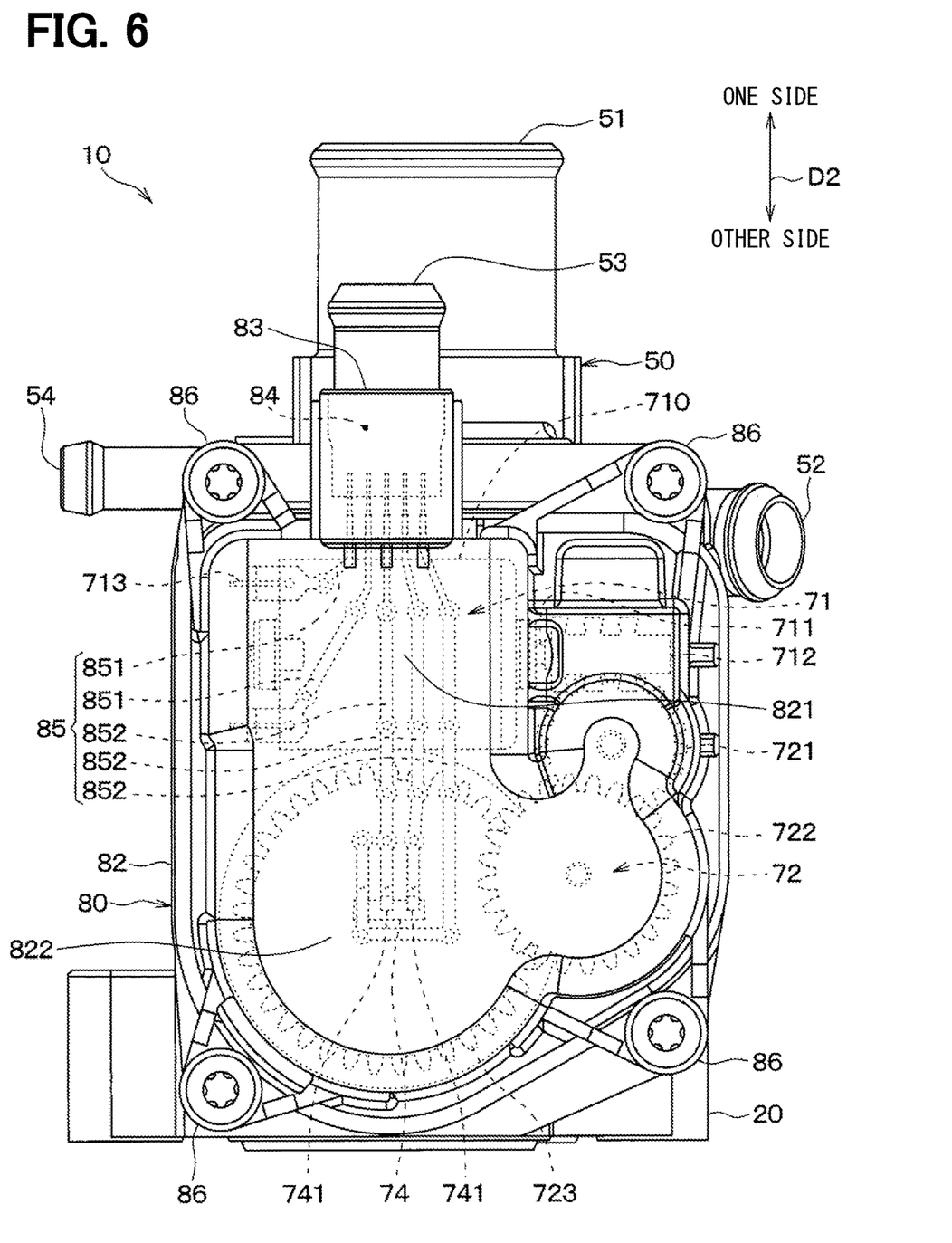
FIG. 6 is a front view of the valve device of the first embodiment as viewed from a side where a drive device cover is placed while the drive device and a rotational angle sensor placed inside the drive device cover are overlapped with the drive device cover.
Figure 7:
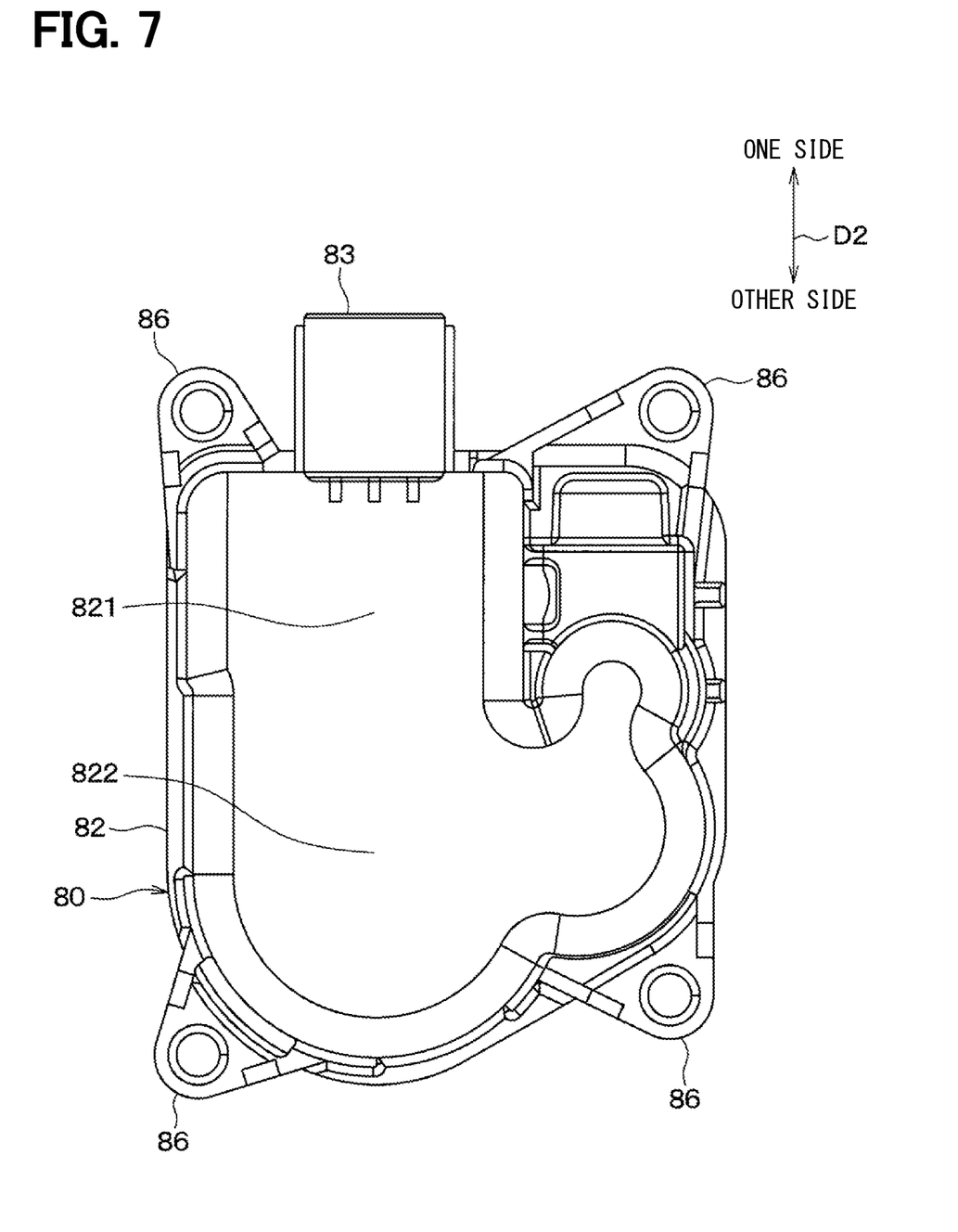
FIG. 7 is a front view of the drive device cover according to the first embodiment.

As shown in FIGS. 6 and 7, the drive device cover 80 has a cover main body 82 and the connector 83 while the connector 83 projects from the cover main body 82. The cover main body 82 forms the drive device space 81 at the inside of the drive device cover 80. The cover main body 82 has a motor opposing portion 821 and a gear opposing portion 822. The motor opposing portion 821 is a portion of the cover main body 82 that is opposed to the electric motor 71 in the axial direction of the shaft 32. A direction, which is perpendicular to the plane of each of FIGS. 6 and 7, coincides with the axial direction of the shaft 32. The gear opposing portion 822 is a portion of the cover main body 82 that is opposed to the gear arrangement 72 in the axial direction of the shaft 32. The connector 83 is an externally connecting portion that is configured to electrically connect the drive device 70 and the rotational angle sensor 74 to the outside, more specifically, the ECU and the vehicle battery (serving as at least one external device) through, for example, a wire harness.

As shown in FIG. 6, in the drive device space 81, the electric motor 71 is arranged such that a direction, which is perpendicular to the motor shaft 711, coincides with the perpendicular direction D2. The electric motor 71 is placed on the one side of the gear arrangement 72 in the perpendicular direction D2. Specifically, the electric motor 71 is placed on the one side of the gear arrangement 72 where the pipe member 50 is placed relative to the housing 20 in the perpendicular direction D2.

The gear arrangement 72 and the rotational angle sensor 74 are placed on the other side of the electric motor 71 in the perpendicular direction D2. Specifically, the first gear 721 is placed on the other side of the worm gear 712 in the perpendicular direction D2. The third gear 723 and the rotational angle sensor 74 are placed on the other side of the motor main body 710 in the perpendicular direction D2.

As shown in FIGS. 2, 6 and 7, an outer surface of the motor opposing portion 821 and an outer surface of the gear opposing portion 822 at the cover main body 82 are flat and coplanar (i.e., flush with each other) without forming a step between the outer surface of the motor opposing portion 821 and the outer surface of the gear opposing portion 822.

As shown in FIG. 6, the connector 83 is placed on the one side of the electric motor 71 in the perpendicular direction D2. Specifically, the connector 83 is placed on the one side of the electric motor 71 where the pipe member 50 is placed relative to the housing 20 in the perpendicular direction D2.

In other words, the connector 83 is placed on the one side of the cover main body 82 in the perpendicular direction D2. The connector 83 projects from the cover main body 82 toward the one side in the perpendicular direction D2. Specifically, the connector 83 is placed on the one side of the cover main body 82 where the pipe member 50 is placed relative to the housing 20 in the perpendicular direction D2. The connector 83 projects from the cover main body 82 on the one side where the pipe member 50 is placed relative to the housing 20 in the perpendicular direction D2. Furthermore, the connector 83 is placed on the one side of the cover main body 82, which is opposite to the engine 2 in the perpendicular direction D2. The connector 83 projects from the cover main body 82 toward the one side, which is opposite to the engine 2 in the perpendicular direction D2. Therefore, when the connector 83 is viewed from the one side (the left side in FIG. 2) in the axial direction D1, the connector 83 overlaps with the first pipe portion 51 and the third pipe portion 53. In other words, an extent of the connector 83 measured in the perpendicular direction D2 overlaps with an extent of the first pipe portion 51 and an extent of the third pipe portion 53 measured in the perpendicular direction D2.

The connector 83 is shaped in a tubular form that is elongated in the perpendicular direction D2. As shown in FIGS. 2 and 6, a connection space 84 is formed at an inside of the connector 83. An opening is formed at an end of the connector 83, which is located on the one side in the perpendicular direction D2. The other end of the connector 83, which is located on the other side in the perpendicular direction D2, is closed. One ends of a plurality of external connection terminals 85 are exposed in the connection space 84.

As shown in FIG. 6, the external connection terminals 85 include two motor connection terminals 851 and three sensor connection terminals 852. The motor connection terminals 851 are terminals that are electrically connected to the electric motor 71. The sensor connection terminals 852 are terminals that are electrically connected to the rotational angle sensor 74.

Specifically, the one ends of the two motor connection terminals 851 are placed in the connection space 84. The other ends of the motor connection terminals 851 are respectively connected to the motor side terminals 713. The motor connection terminals 851 are embedded in the cover main body 82, i.e., are insert-molded in the cover main body 82 such that the motor connection terminals 851 extend from the connection space 84 to the motor side terminals 713 through the motor opposing portion 821 (more specifically, through a wall of the motor opposing portion 821). A portion of each of the motor connection terminals 851, which is embedded in the motor opposing portion 821, i.e., is insert-molded in the motor opposing portion 821, is shaped in a planar form.

One ends of the three sensor connection terminals 852 are placed in the connection space 84. The other ends of the sensor connection terminals 852 are connected to the sensor side terminals 741 of the rotational angle sensor 74. The sensor connection terminals 852 are embedded in the cover main body 82, i.e., are insert-molded in the cover main body 82 such that the sensor connection terminals 852 extend from the connection space 84 to the rotational angle sensor 74 through the motor opposing portion 821 (more specifically, through the wall of the motor opposing portion 821). A portion of each of the sensor connection terminals 852, which is embedded in the motor opposing portion 821, i.e., is insert-molded in the motor opposing portion 821, is shaped in a planar form.

Furthermore, as shown in FIGS. 6 and 7, the drive device cover 80 has four fastening portions 86 that project from the cover main body 82. The fastening portions 86 are placed at four corners, respectively, of the cover main body 82. The drive device cover 80, which is formed in the above-described manner, is molded from synthetic resin. In manufacturing of the drive device cover 80, resin molding is performed in a state where the plurality of external connection terminals 85 is placed inside a resin molding die.

Next, the operation of the valve device 10 will be described. The ECU (not shown) computes the required flow rate of the coolant for each of the air conditioning heat exchanger 3, the oil cooler 4 and the radiator 5 based on the operational state of the vehicle, and the ECU computes the rotational angle of the valve element 31, i.e., the rotational angle of the electric motor 71 for implementing the required flow rates of the coolant, which are respectively required at the air conditioning heat exchanger 3, the oil cooler 4 and the radiator 5. Then, the ECU transmits the information about the computed rotational angle of the electric motor 71 to the valve device 10.

In the valve device 10, the electric motor 71 is rotated based on the information of the rotational angle received from the ECU. In the valve device 10, when the electric motor 71 is rotated, the valve element 31 is rotated through the gear arrangement 72 and the shaft 32. Therefore, the coolant is discharged from the first to third valve element openings 331-351 at the required flow rates, respectively. Specifically, the valve device 10 discharges the coolant from the first valve element opening 331 at the required flow rate that is required at the radiator 5. The valve device 10 discharges the coolant from the second valve element opening 341 at the required flow rate that is required at the air conditioning heat exchanger 3. The valve device 10 discharges the coolant from the third valve element opening 351 at the required flow rate that is required at the oil cooler 4.

Furthermore, in the valve device 10, the rotational angle sensor 74 detects the rotational angle of the third gear 723 and sends the information of the detected rotational angle to the ECU. The ECU computes the rotational angle of the shaft 32 based on the information of the rotational angle of the third gear 723 received from the valve device 10, and the ECU determines whether the coolant is supplied to each of the air conditioning heat exchanger 3, the oil cooler 4 and the radiator 5 at the required flow rate without excess or insufficiency. Then, in a case where the coolant, which is discharged to the air conditioning heat exchanger 3, the oil cooler 4 and the radiator 5, becomes excessive or insufficient, the ECU computes the rotational angle of the electric motor 71, which can implement an optimum flow rate of the coolant, and the ECU transmits the information of the computed rotational angle to the valve device 10.

The valve device 10 receives the information of the rotational angle of the electric motor 71 from the ECU and adjusts the rotational angle of the electric motor 71 based on the received information of the rotational angle.

Next, advantages of the present embodiment will be described.

(1) In the present embodiment, the connector 83 is placed on the one side of the cover main body 82 where the pipe member 50 is placed relative to the housing 20 in the perpendicular direction D2. Furthermore, the connector 83 projects from the cover main body 82 on the one side where the pipe member 50 is placed relative to the housing 20 in the perpendicular direction D2.

Accordingly, the maximum size of the valve device 10 measured in the projecting direction of the connector 83 (the perpendicular direction D2) can be reduced in comparison to a case where the connector 83 is placed on the other side of the cover main body 82, which is opposite to the one side of the cover main body 82 where the pipe member 50 is placed relative to the housing 20 in the perpendicular direction D2, and the connector 83 projects from the cover main body 82 on the other side in the perpendicular direction D2.

Furthermore, previously, there has been proposed a valve device, in which the connector 83 projects from the cover main body 82 on the other side of the cover main body 82, which is opposite to the one side of the cover main body 82 where the pipe member 50 is placed relative to the housing 20 in the perpendicular direction D2. In this previously proposed valve device, it would be difficult to ensure a required space that is required to perform a connecting operation of the connector 83 in a state where the valve device is installed to the vehicle.

In contrast, according to the present embodiment, at the time of installing the valve device 10 to the vehicle, the connecting operation of the connector 83 can be performed on the common side where a connecting operation of the pipe member 50 is performed. Thus, it is possible to ensure the required space that is required to perform the connecting operation of the connector 83.

(2) There has been proposed another valve device, in which the connector 83 is placed on a side of the cover main body 82 where the engine 2 is placed, and the connector 83 projects from the cover main body 82 toward the engine 2. When this previously proposed valve device is installed to the vehicle, the connector 83 may possibly interfere with the installation of the valve device to the vehicle. Therefore, this previously proposed valve device is poor in mountability on the vehicle.

In contrast, according to the present embodiment, the pipe member 50 is installed to the housing 20 at the location that is on the one side of the housing 20, which is opposite to the engine 2 in the perpendicular direction D2. Therefore, the connector 83 is placed on the one side of the cover main body 82, which is opposite to the engine 2 in the perpendicular direction D2. The connector 83 projects from the cover main body 82 on the one side of the cover main body 82, which is opposite to the engine 2 in the perpendicular direction D2.

Accordingly, the connector 83 does not project from the valve device 10 toward the engine 2. Thus, in comparison to the previously proposed valve device, in which the connector 83 projects from the valve device toward the engine 2, the mountability of the valve device 10 on the vehicle can be improved. Furthermore, in comparison to the previously proposed valve device, in which the connector 83 projects from the valve device 10 toward the engine 2, the connecting operation of the connector 83 is eased.

(3) In the present embodiment, the rotational angle sensor 74 is opposed to the gear arrangement 72 in the axial direction of the shaft 32. The electric motor 71 is placed on the one side of the gear arrangement 72 where the pipe member 50 is placed relative to the housing 20 in the perpendicular direction D2. The connector 83 is placed on the one side of the electric motor 71 where the pipe member 50 is placed relative to the housing 20 in the perpendicular direction D2.

Accordingly, in comparison to the case where the electric motor 71 is not arranged in the above-described manner, the maximum size of the valve device 10 measured in the projecting direction of the connector 83 can be reduced.

(4) There has been proposed another valve device, in which a portion of each sensor connection terminal 852 is bent (e.g., is curved) along the outer shape of the electric motor 71. In this previously proposed valve device, the drive device cover 80 is resin molded in a state where the sensor connection terminals 852 are placed at the inside of the resin molding die. However, a state, in which each sensor connection terminal 852 having the bent portion is urged by the molding die, is unstable. Therefore, resin molding failure is likely to occur. That is, the moldability of the drive device cover 80 is low. Therefore, in this previously proposed valve device, the dimensional accuracy of the drive device cover 80 is low.

In contrast, according to the present embodiment, the portion of each of the sensor connection terminals 852, which is embedded in the motor opposing portion 821, i.e., is insert-molded in the motor opposing portion 821, is shaped in the planar form. Thus, the sensor connection terminals 852 can be stably urged by the molding die at the time of molding. This improves the moldability of the drive device cover 80 in comparison to the previously proposed valve device, in which the portion of each sensor connection terminal 852 is bent. Thus, the dimensional accuracy of the drive device cover 80 is improved.

(5) In the present embodiment, the outer surface of the motor opposing portion 821 and the outer surface of the gear opposing portion 822 at the cover main body 82 are flat and coplanar (i.e., flush with each other) without forming the step between the outer surface of the motor opposing portion 821 and the outer surface of the gear opposing portion 822. Accordingly, the moldability of the drive device cover 80 can be improved in comparison to a case where the outer surface of the motor opposing portion 821 and the outer surface of the gear opposing portion 822 are not formed to be flat and coplanar without forming the step between the outer surface of the motor opposing portion 821 and the outer surface of the gear opposing portion 822, such as a case where the outer surface of the motor opposing portion 821 is a curved surface that extends along the outer shape of the electric motor 71. Thus, the dimensional accuracy of the drive device cover 80 is improved.

Other Embodiments (1) In the first embodiment, the pipe member 50 is installed to the housing 20 at the location that is on the one side of the housing 20, which is opposite to the engine 2 in the perpendicular direction D2. Alternatively, the pipe member 50 may be installed to the housing 20 at a location that is on another different side of the housing 20, which is other than the engine 2 side. In such a case, the connector 83 is placed on the different side of the cover main body 82, which is other than the engine 2 side.

(2) In the first embodiment, the electric motor 71 and the gear arrangement 72 are arranged at the inside of the drive device cover 80 in the manner shown in FIG. 5. Alternatively, the electric motor 71 and the gear arrangement 72 may be arranged in a manner that is different from the manner shown in FIG. 5.

(3) In the first embodiment, the portion of each of the three sensor connection terminals 852, which is embedded in the cover main body 82, i.e., is insert-molded in the cover main body 82, is shaped in the planar form. Alternatively, these portions of the sensor connection terminals 852 may be respectively shaped in a bent form (e.g., a curved form).

(4) In the first embodiment, the outer surface of the motor opposing portion 821 and the outer surface of the gear opposing portion 822 at the cover main body 82 of the drive device cover 80 are flat and coplanar without forming the step between the outer surface of the motor opposing portion 821 and the outer surface of the gear opposing portion 822. Alternatively, the outer surface of the motor opposing portion 821 and the outer surface of the gear opposing portion 822 may not be flat.

(5) The present disclosure is not necessarily limited to the above-described embodiments and can be appropriately modified within the scope of the present disclosure, and the present disclosure may include various modifications and variations within the equivalent range. Further, the above embodiments are not unrelated to each other and can be appropriately combined unless such a combination is obviously impossible. Further, in each of the above-described embodiments, it should be understood such that the elements constituting the embodiment are not necessarily essential unless explicitly specified as being essential and/or considered to be obviously essential in principle. Further, in each of the above-described embodiments, when numerical values, such as the number of components of the embodiment, values, amounts, ranges, are mentioned, the present disclosure should not be limited to such a numerical value unless explicitly specified as being essential and/or considered to be obviously essential in principle. Further, in each of the above-described embodiments, when referring to a material, a shape, a positional relationship or the like of the respective constituent elements, the present disclosure should not be limited to the material, the shape, the positional relationship or the like unless explicitly specified as being essential and/or considered to be obviously essential in principle.

What is claimed is:

1. A valve device configured to adjust a flow rate of coolant for an internal combustion engine, comprising:
   a housing that has:
      an inside space, which is formed at an inside of the housing;
      a flow inlet, which is configured to conduct the coolant into the inside space; and
      a plurality of flow outlets, which are configured to discharge the coolant from the inside space;
   a valve that is placed in the inside space and has:
      a valve element that is configured to adjust a flow rate of the coolant outputted from each of the plurality of flow outlets; and
      a rotatable shaft that is configured to rotate the valve element;
   a pipe member that is installed to the housing at a location, which is on one side of the housing in a perpendicular direction that is perpendicular to an axial direction of the rotatable shaft, wherein the pipe member has a plurality of outlet pipes, each of which forms a flow passage that is communicated with a corresponding one of the plurality of flow outlets and is configured to discharge the coolant outputted from the corresponding one of the plurality of flow outlets;
   a drive device that is configured to rotate the rotatable shaft and is placed outside the housing at a location, which is on one side of the housing in the axial direction;
   a sensor that is configured to detect a rotational angle of the rotatable shaft and is placed outside the housing at the location that is on the one side of the housing in the axial direction; and
   a drive device cover that receives the drive device and the sensor at an inside of the drive device cover and is placed outside the housing at the location that is on the one side of the housing in the axial direction, wherein:
   the drive device cover has:
      a cover main body that forms a space, which receives the drive device; and
      a connector that includes a plurality of terminals each of which is insert molded in a base of the connector made of resin and projects into a connection space of the connector, wherein the connector is configured to electrically connect the drive device and the sensor to at least one external device through the plurality of terminals; and
   the connector is placed on one side of the cover main body where the pipe member is placed relative to the housing in the perpendicular direction, and the connector projects from the cover main body on the one side of the cover main body in the perpendicular direction.

2. The valve device according to claim 1, wherein:
   the pipe member is installed to the housing at the location that is on the one side of the housing, which is opposite to the internal combustion engine in the perpendicular direction; and
   the connector is placed on the one side of the cover main body, which is opposite to the internal combustion engine in the in the perpendicular direction, and the connector projects from the cover main body on the one side of the cover main body, which is opposite to the internal combustion engine in the perpendicular direction.

3. The valve device according to claim 1, wherein:
   the drive device includes:
      an electric motor that is configured to output a drive force, which rotates the rotatable shaft; and
      a gear arrangement that is configured to transmit the drive force, which is outputted from the electric motor, to the rotatable shaft;
   the sensor is opposed to the gear arrangement in the axial direction;
   the electric motor is placed on one side of the gear arrangement where the pipe member is placed relative to the housing in the perpendicular direction; and
   the connector is placed on one side of the electric motor where the pipe member is placed relative to the housing in the perpendicular direction.

4. The valve device according to claim 3, wherein:
   the connection space is formed at an inside of the connector;
   the drive device cover is molded from synthetic resin;
   the cover main body has a motor opposing portion that is opposed to the electric motor in the axial direction;
   the plurality of terminals includes a sensor connection terminal while the sensor connection terminal has one end located in the connection space and another end electrically connected to the sensor;
   the sensor connection terminal is embedded in the cover main body such that the sensor connection terminal extends from the connection space to the sensor through the motor opposing portion; and
   a portion of the sensor connection terminal, which is embedded in the motor opposing portion, is shaped in a planar form.

5. The valve device according to claim 4, wherein:
   the cover main body has a gear opposing portion that is opposed to the gear arrangement in the axial direction; and an outer surface of the motor opposing portion and an outer surface of the gear opposing portion at the cover main body are flat and coplanar without forming a step between the outer surface of the motor opposing portion and the outer surface of the gear opposing portion.

6. The valve device according to claim 1, wherein the plurality of outlet pipes of the pipe member are formed integrally in one-piece.

7. The valve device according to claim 1, wherein the drive device cover is formed separately from the housing and is fixed to the housing.

* * * * *